(No Model.) 3 Sheets—Sheet 1.
M. MARSA.
HOP PICKER.
No. 537,056. Patented Apr. 9, 1895.
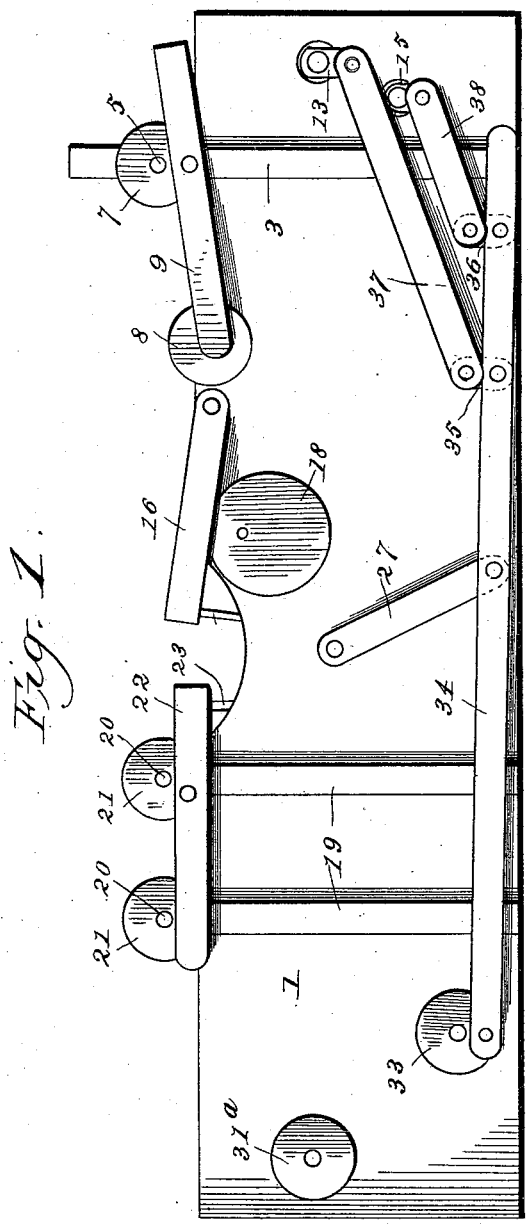

(No Model.) 3 Sheets—Sheet 2.
M. MARSA.
HOP PICKER.
No. 537,056. Patented Apr. 9, 1895.
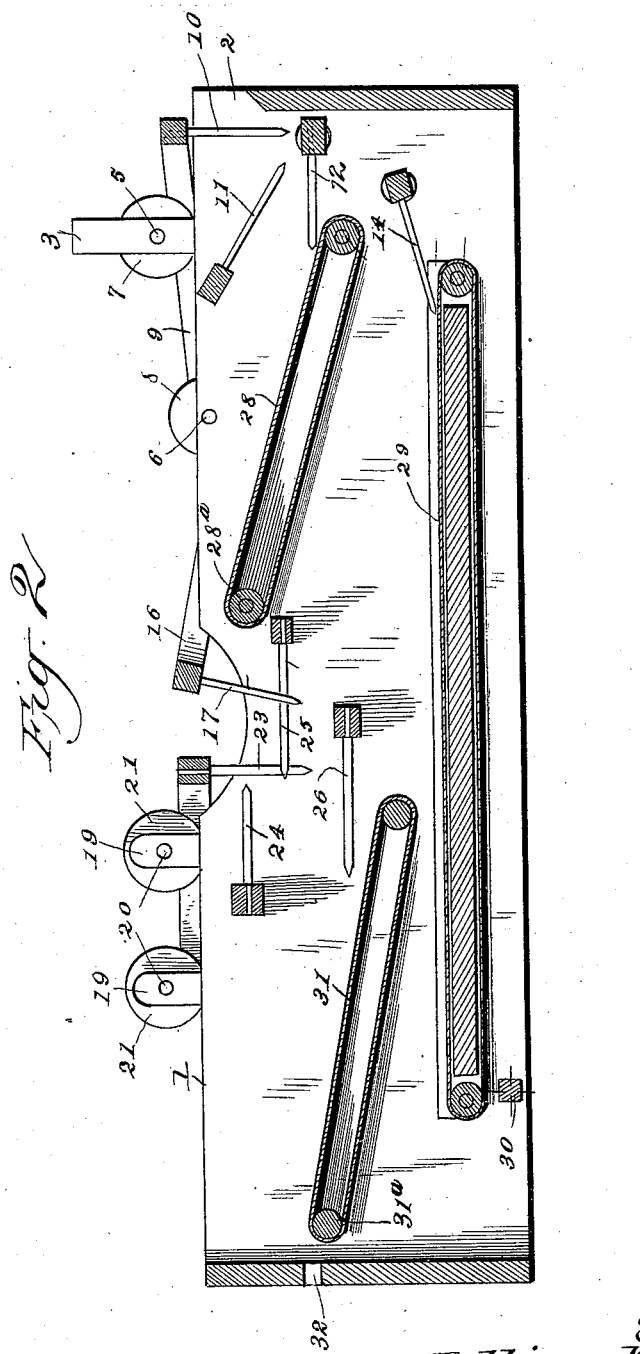
Witnesses
J. H. Reynolds
Chas. S. Hyer
Inventor
Mathias Marsa
By John Wedderburn
Attorney (No Model.) 3 Sheets—Sheet 3.
M. MARSA.
HOP PICKER.
No. 537,056. Patented Apr. 9, 1895.
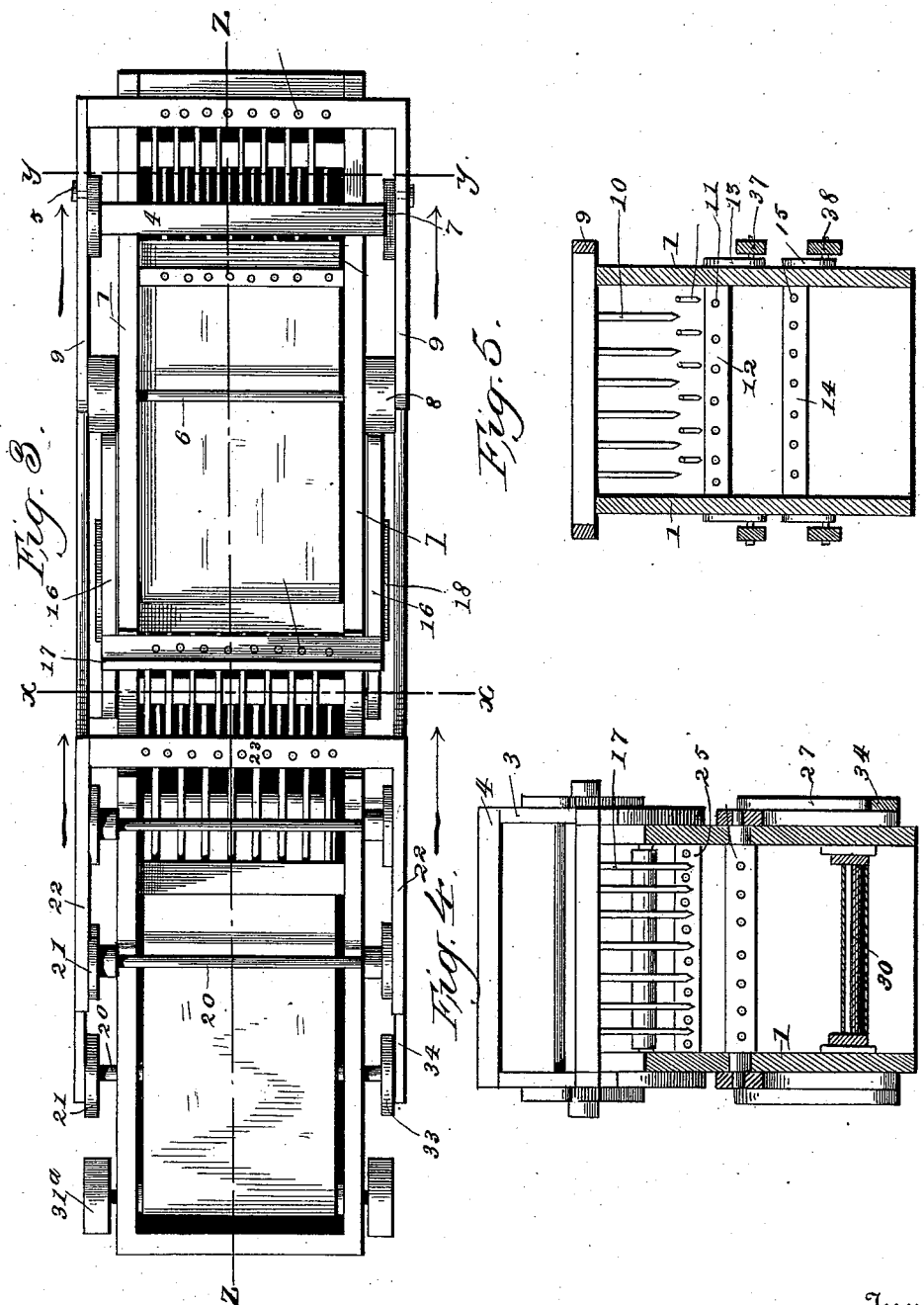
Witnesses
J. M. Reynolds
Chas. S. Hyer.
Inventor
Mathias Marsa.
By John Wedderburn
Attorney

UNITED STATES PATENT OFFICE.

MATHIAS MARSA, OF NORTH YAKIMA, WASHINGTON.

HOP-PICKER.

SPECIFICATION forming part of Letters Patent No. 537,056, dated April 9, 1895.

Application filed March 23, 1894. Serial No. 504,778. (No model.)

*To all whom it may concern:*

Be it known that I, MATHIAS MARSA, a citizen of the United States, and a resident of North Yakima, in the county of Yakima and State of Washington, have invented certain new and useful Improvements in Hop-Pickers; and I do hereby declare the following to be a full, clear, and exact description of the invention, such as will enable others skilled in the art to which it appertains to make and use the same.

My invention relates to improvements in combined hop stripping, cleaning and separating machines, the object of the same being to provide in a single apparatus devices which will automatically strip the hops from the vine, separate the same from the leaves and trash, discharge the refuse matter from one point, and finally discharge the separated hops thoroughly cleaned from another part of the machine.

The invention consists of an outer casing, having a pair of stripping combs located in the top of the machine, mounted in a suitable reciprocating frame and adapted to move back and forth as well as upwardly and downwardly, in order to strip the hops from the vines. The said stripping combs have located in connection therewith cleaning combs therefor, and located beneath them vibrating separating combs, the same being mounted upon suitable shafts and all vibrated in unison by means of suitable connections with the main drive shaft. I further provide in the casing belts or carriers for conveying the hops from one stripping comb to another, for conveying refuse matter from the stripping combs to the discharge outlet and for conveying the hops which have been stripped from the vines and separated by the primary stripping and separating comb to the final separating device.

The invention further consists in other details of construction, combinations of parts and arrangements of instrumentalities which will be hereinafter more fully described and pointed out in the claims.

In the drawings forming a part of this specification, Figure 1 is a side elevation of the machine embodying my invention. Fig. 2 is a central longitudinal section of the same. Fig. 3 is a top plan view thereof. Fig. 4 is a transverse vertical section on the line $x—x$, Fig. 3. Fig. 5 is a similar section on the line $y—y$, Fig. 3.

Like numerals indicate like parts in the various views.

1 represents a casing, the forward end of which is cut away as shown at 2, for the insertion of the vine to the stripping comb. In the forward part of the machine on each side thereof are uprights 3, connected by a cross beam 4 in which is mounted in suitable bearings, a crank shaft 5. Slightly in the rear of said uprights, and mounted in bearings on the top of the casing 1 is a similar crank shaft 6, both of which shafts 5 and 6 are provided on their outer ends with pulleys 7 and 8, by means of which power is applied thereto for the purpose of rotating. Mounted in the crank portion of these shafts 5 and 6 are two side beams 9, 9, of the primary stripping frame. The forward part of the beams 9, 9, have connected therewith the primary stripping comb 10 having downwardly projecting teeth, as shown. By the rotation of the shafts 5 and 6 it will be seen that the stripping comb 10 is caused to reciprocate back and forth for the purpose of stripping the hops from the vines. At a point just in the rear of the stripping comb 10 is a stationary cleaning comb 11, whose teeth are adapted to pass alternately between the teeth of said stripping comb upon the backward movement of said stripping comb and thereby clear the same from any hops or leaves that may be sticking thereto. Just beneath the stripping comb 10 is a vibrating separating comb 12 mounted upon a shaft projecting through the sides of the casing 1 and having a crank 13 at its outer end, through which and mechanism to be described later, the vibrating movement is imparted thereto. The teeth of the comb 12 extend rearwardly and rest just above one end of the carrier belt to be described later. Beneath the separating comb 12, slightly in the rear thereof, is a second separating comb 14, which is similarly mounted upon a shaft extending through the sides of the casing 1 and having a similar crank 15 connected therewith, by means of which the vibrating motion is given thereto. The teeth of this comb 14 likewise extend rearwardly and rest just over the second carrier belt which will be described later. To the rear of the stripping frames 9, 9, just described, is pivoted to the sides of the casing 1 two bars 16, 16, which extend rearwardly and have connected at their free ends a holding comb 17, whose teeth project downwardly. The bars 16 of this frame rest upon eccentrically mounted rollers 18, 18, and during the rotation of said rollers, the said bars 16 carrying the holding comb 17 are given a rising and falling movement for a purpose which will appear later. To the rear of the holding comb 17, and secured to each side of the casing 1 are two uprights 19, 19, in which are mounted crank shafts 20, 20, having pulleys 21, 21, on their outer ends, by means of which power is applied thereto. In the crank portions of the shafts 20 are mounted two bars 22 of the second stripping frame, and at the forward end of these bars is connected a stripping comb 23, whose teeth project downwardly. By the rotation of the crank shafts 20 the stripping comb 23 is given a backward and forward as well as an upward and downward movement. Slightly in the rear of the stripping comb 23 is a stationary cleaning omb therefor, 24, whose teeth project forwardly and upon the backward movement of the stripping comb 23 the same project alternately through the teeth of said stripping comb for the purpose of cleaning the same from any hops, leaves or stems that may adhere thereto.

Just beneath the holding comb 17 is a stationary comb 25, with rearwardly projecting teeth, which receive the hops and vines as they are fed from the carrier belt to the stripping comb 23. Slightly beneath and to the rear of the comb 25 is a vibrating separating comb 26, whose teeth project rearwardly and rest slightly above the carrier belt to be described later. This comb 26 is mounted upon a shaft projecting through the sides of the casing, and has connected therewith a bar 27, through which and mechanism to be described the vibrating motion is given to said separating comb.

28 is a carrier belt secured upon suitable rollers 28$^a$ rotatably mounted in the casing 1 and extending from the separating comb 12 rearwardly to the holding comb 17. This conveys the hops, leaves, &c., which have been stripped from the vine to the second stripping comb 23, by the stripping comb 10. The said hops, leaves, &c., are held by the comb 17 while the latter is in its downward position. When it is raised out of engagement therewith by the eccentric rollers 18 they are further treated.

Extending longitudinally of the casing and located near the bottom thereof in a substantially horizontal plane is a carrier belt 29. The forward part of said belt is just beneath the separating comb 14 and is mounted upon suitable rollers projecting from the sides of the casing.

Beneath the rear end of the carrier belt 29 is the final separator 30. This consists of a shaft substantially rectangular in cross section and having four series of teeth along its sides. The shaft is mounted in suitable bearings in the casing and is adapted to be rotated by means of a belt connected to the side thereof. The hops which have been stripped by the stripping comb 10 and separated by the two separating combs 12 and 14 drop upon the belt 29 and are carried rearward to the final separator 30 where the cleaned hops are discharged from the machine. A third carrier belt 31 secured to rollers 31$^a$ mounted in the casing 1 extends from the separating comb 26 rearwardly to a point just opposite the discharge opening 32 at the rear of the casing. This belt carries the refuse matter, stems, leaves, &c., from the stripping comb 23 rearwardly and discharges the same out through the opening 32. The hops which have been separated by the combined action of the stripping comb 23 and the separating comb 26 fall through onto the carrier belt 29 and thence carried to the final separator 30. The roller upon which the carrier belt 29 is secured has upon its outer ends crank disks 33, the crank arm of which is connected to a pitman 34 extending forwardly therefrom almost the entire length of the machine. At about the center thereof it is pivoted to the lower end of the bar 27, which is rigidly secured to the shaft of the vibrating separating comb 26. Near the front end of the pitman 34 it has pivoted thereto two links 35 and 36, the link 35 having pivoted to it and to the crank 13 a bar 37. The link 36 has pivoted to it and to the crank 15 a bar 38. By this construction it will be seen that the rotation of the shaft upon which the carrier 29 is secured will cause a reciprocation of the pitman 34, which will in turn transmit motion through the bars 27, 37 and 38 to the vibrating separating combs 26, 12 and 14.

The invention has now been sufficiently described to enable its operation to be readily understood. Briefly stated, this is as follows: Power is applied by means of belts or otherwise to the pulleys 7 or 8, 18, 21, 31$^a$, and the roller upon which the rear end of the carrier belt 29 is mounted. The hop vine is then applied through the cut-away portion 2 of the casing, and the same is turned by hand, being thus placed within range of the stripping comb 10 and the said comb being reciprocated by means of the rotation of the pulleys 7 or 8 on the crank shaft upon which the frame of this comb is mounted, the said vine is stripped of its leaves, and hops, &c., and carried into the machine. The cleaning comb 11 keeps the teeth of the stripping comb clear. The stripped hops, leaves, &c., fall down upon the vibrating separating comb 12, the vibration of which tends to separate the leaves from the hops, &c. The separated hops fall down upon the vibrating separating comb 14 and the separating operation is completed thereby, and the same drop on the carrier belt 29 and are lead rearwardly to the final separator 30. The hops, leaves, &c., which have not been separated are led from the separating comb 12 upon the belt carrier 28, rearwardly to the holding comb 17 and fed thence to the stripping comb 23. This stripping comb has a forward and backward movement similar to the stripping comb 10 before described, and the hops, leaves, &c., being held by the comb 17, the stripping operation is completed. At each rotation of the eccentrically mounted rollers 18, the holding comb 17 is thrown upward out of engagement with the hops, &c., and the same allowed to pass through onto the stationary comb 25 and from thence into engagement with the vibrating separating comb 26. The separated hops drop therefrom onto the carrier belt 29 and are led rearwardly to the final separator 30, and the twigs, trash and dirt are led from the separating comb 26 upon the belt 31 and out through the discharge opening 32.

It will thus be seen that I provide in a single apparatus, mechanism which is operated by the simple application of power, which will strip the hop vine, separate and clean the hops and leaves, and discharge the refuse matter at one point and the hops at another point.

The invention has been described in its preferred form, but it is obvious that many minor changes may be made therein without departing from the nature or spirit of the invention, or sacrificing any of its advantages. All such obvious changes and modifications are clearly within the scope of my invention and are intended to be covered by this patent.

Having now described my invention, what I claim as new, and desire to secure by Letters Patent, is—

1. The combination with a casing, of a stripping comb, a pair of crank shafts mounted in said casing upon which said stripping comb is mounted whereby the latter is given a backward and forward and upward and downward movement in said casing, and a stationary cleaning comb at the rear of said stripping comb, whose teeth are out of engagement with the teeth of the stripping comb during the downward and during part of the backward movement of said stripping comb, and which project through the teeth of said stripping comb upon the end of the backward stroke and upon the upward stroke of the said stripping comb, substantially as described.

2. The combination with a casing, of a pair of crank shafts mounted therein and adapted to be rotated, a frame mounted upon the crank portions of said shafts, receiving a backward and forward and upward and downward movement during the rotation of said shafts, and having a stripping comb with downwardly projecting teeth at one end thereof, and a stationary cleaning comb at the rear of said stripping comb, whose teeth are out of engagement with the teeth of the stripping comb during the downward and part of the backward movement of said stripping comb and which project between the teeth of the stripping comb at the end of the backward stroke and on the upward stroke of the latter, substantially as described.

3. In a device of the character described, the combination with a casing, of a reciprocating stripping comb, a stationary cleaning comb therefor, a vibrating separating comb beneath said stripping comb and conveyer belts leading therefrom, whereby the hops and leaves are stripped from a vine, the same are separated from one another, the hops are discharged from one part of the machine, and the leaves and trash discharged from another part of the machine, substantially as described.

4. In a device of the character set forth, the combination with a casing, of a reciprocating stripping comb, a stationary cleaning comb therefor, a vibrating separating comb, beneath said stripping comb, a second vibrating separating comb located beneath the first separating comb, a vibrating holding comb, a belt carrier leading from the said stripping comb to the said holding comb, secondary stripping, cleaning and separating mechanism, a carrier belt leading from said secondary mechanism for carrying the waste therefrom and discharging it from the machine, a carrier belt extending longitudinally through the casing and located beneath the primary and secondary separating devices, and a final separator, substantially as and for the purpose described.

In testimony whereof I have signed this specification in the presence of two subscribing witnesses.

MATHIAS MARSA.

Witnesses:
WILHELM SCHREIER,
JOHN D. CORNETT.